No. 641,155. Patented Jan. 9, 1900.
A. F. SEVERANCE.
INSECT DESTROYER.
(Application filed May 9, 1899.)
(No Model.)
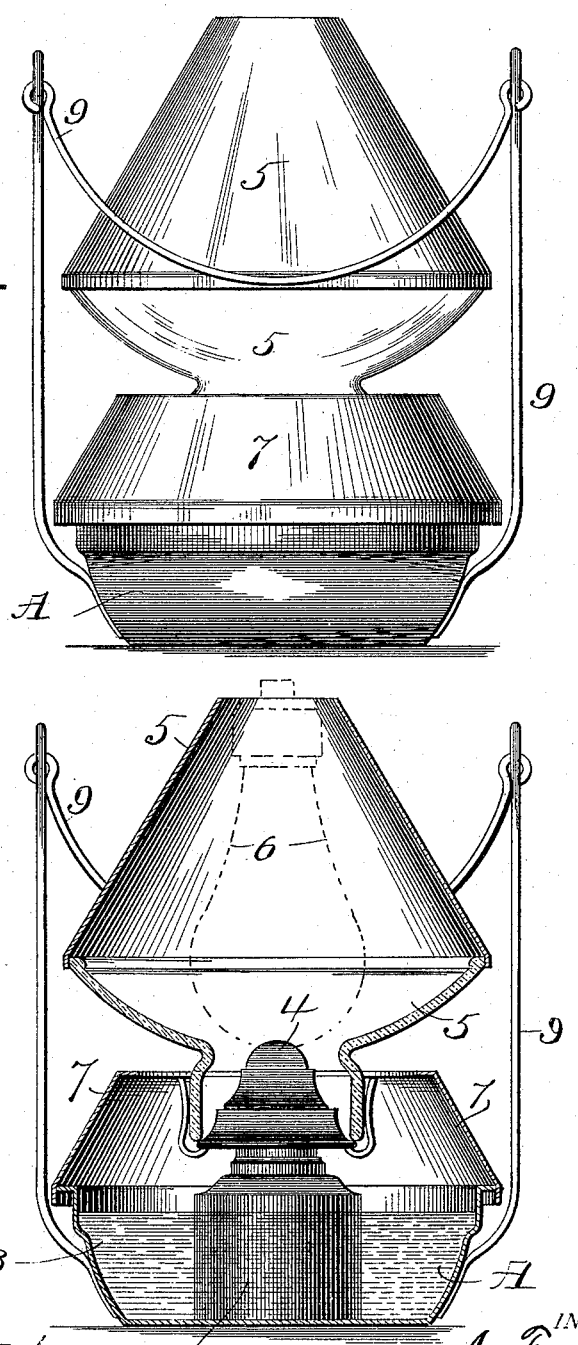

United States Patent Office.

ASA F. SEVERANCE, OF NOBLEBOROUGH, MAINE.

INSECT-DESTROYER.

SPECIFICATION forming part of Letters Patent No. 641,155, dated January 9, 1900.

Application filed May 9, 1899. Serial No. 716,164. (No model.)

*To all whom it may concern:*

Be it known that I, ASA F. SEVERANCE, of Nobleborough, in the county of Lincoln and State of Maine, have invented certain new and useful Improvements in Insect-Destroyers; and I do hereby declare the following to be a full, clear, and exact description of the invention, such as will enable others skilled in the art to which it appertains to make and use the same.

My invention relates to an improvement in insect-destroyers, the object being to provide a cheap, simple, and efficient device adapted to attract and destroy insects; and it consists in certain novel features of construction and combinations of parts, as will be hereinafter more fully described, and pointed out in the claims.

In the accompanying drawings, Figure 1 represents a view of my improvement, and Fig. 2 is a view of same in vertical section.

A represents a receptacle, open at its upper end and provided centrally with a vessel 2, also open at its upper end and adapted to contain oil or other illuminating fluid or substance, said vessel being provided at its open end with a suitable burner 4 and is of a diameter less than that of the receptacle A, whereby an annular space 3 is formed between the latter and the vessel for the reception of insect-destroying fluid. Supported on burner 4 is a shade 5, preferably constructed in two sections, the lower or flaring section thereof being constructed of any suitable transparent material, preferably glass, while the upper or conical section is constructed of any suitable opaque material, preferably sheet metal, and constituting a chimney.

Supported on the flaring open end of receptacle A is a collar 7, open at both ends, the upper open end of said collar being disposed in a plane slightly below the flaring portion of shade 5, and through which opening the insects attracted by the light emitted through said shade fall or fly.

Should a suitable plant be at hand, electricity may be used for illuminating my improved destroyer, in which case an incandescent or other lamp 6 may be suspended within shade 5, as shown in dotted lines, Fig. 2.

When the device above described is properly illuminated, the light is emitted through the lower or transparent section of shade 5, and owing to the close proximity of the latter to the open end of collar 7 it will be apparent that the insects will fall or fly through said opening as they are attracted by the light, and coming in contact with the destroying agent are instantly rendered helpless and are quickly killed.

The device, which is portable, may be provided with a handle or bail 9, which is used for moving the device from one place to another.

Having fully described my invention, what I claim as new, and desire to secure by Letters Patent, is—

1. An insect-destroyer comprising a pan or receptacle, a tapering ring supported at its larger lower end upon the peripheral edge of said pan or receptacle, a flaring transparent shade disposed over the open upper end of the collar, a conical opaque chimney having its larger end disposed upon the outer edge of the flaring transparent shade and a lamp projecting into said shade.

2. An insect-destroyer comprising a pan or receptacle, a lamp-reservoir located centrally within said pan or receptacle, a collar mounted at its lower edge upon the peripheral edge of the pan or receptacle and having an open upper end, a burner on the lamp-reservoir, a flaring transparent shade having a depending portion passing through the upper end of the collar and supported on said burner, and a conical opaque chimney supported at its larger end upon the upper edge of the flaring shade.

3. In an insect-destroyer, the combination with a pan or receptacle, a lamp-reservoir disposed centrally therein and a burner on said reservoir, of a tapering ring mounted upon the pan or receptacle, a transparent flaring shade having a depending contracted portion passing through the upper end of the tapering ring and mounted on the burner and a conical opaque chimney mounted at its larger end upon the flaring transparent shade.

In testimony whereof I have signed this specification in the presence of two subscribing witnesses.

ASA F. SEVERANCE.

Witnesses:
KENDALL M. DUNBAR,
WILLIAM B. DUNBAR.